//

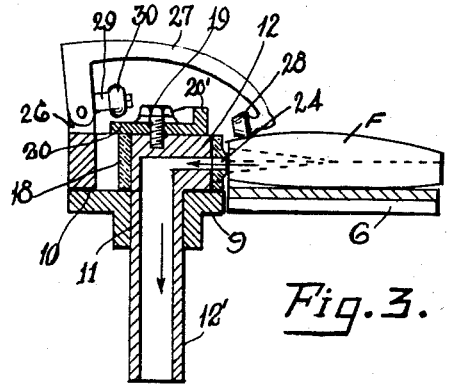
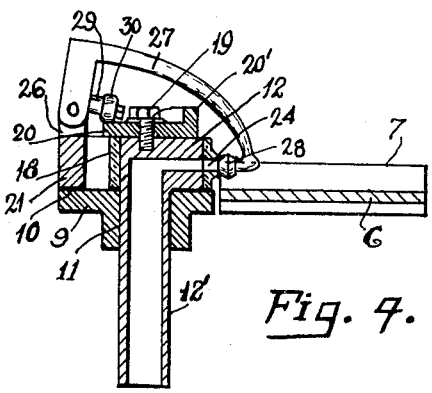
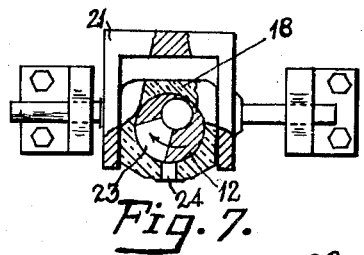
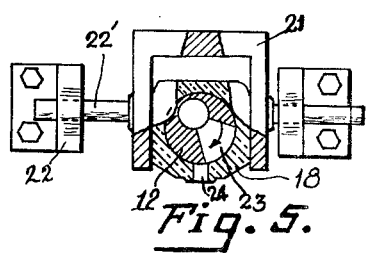
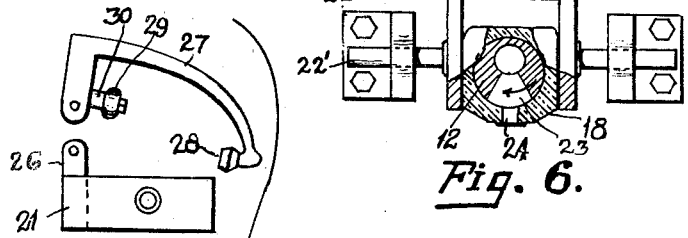
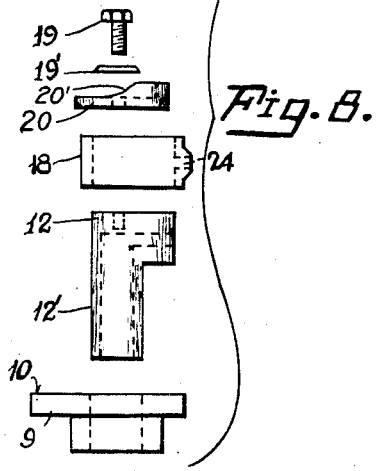

United States Patent Office 2,775,785
Patented Jan. 1, 1957

2,775,785

FISH EVISCERATOR

Karl R. Kurzbin, San Jose, Calif., assignor to Ryder Manufacturing Company, a corporation of California Application November 12, 1953, Serial No. 391,447

5 Claims. (Cl. 17—3)

This invention relates to the fish cleaning art, and more particularly to a fish eviscerating machine.

The present invention provides an improved machine for automatically removing the viscera from fish. In my machine I provide a vacuum chamber having a suction port which is controlled by valve means. The valve means and an endless conveyor for delivering fish in rapid succession to the suction port are synchronized so that each fish reaches the suction port at the precise time the valve opens the latter. The fish are successively decapitated by a cutting knife as they are conveyed toward the suction port by the endless conveyor, thereby exposing their viscera. As the viscera of each fish register with the suction port such viscera are drawn from the visceral cavity, thereby thoroughly cleaning the fish. The operation of the machine is automatic and rapid, thereby making it possible for a fish canning operation to be comparatively less time consuming and costly than the commonly used hand cleaning methods now being used.

The primary object of my invention is to provide an improved and simplified fish eviscerator for automatically removing the viscera from fish.

Other and further objects of my invention will become apparent to those skilled in the art upon understanding the present disclosure or will be specifically pointed out in the description to follow. It is to be understood, however, that the embodiment of my invention herein shown and described is intended for illustration purposes only.

In the accompanying drawings:

Fig. 3 is a sectional view taken on the line 3—3 of Fig. 2, showing the valve in an open position and a fish positioned opposite the suction port and in an eviscerating position;

Fig. 4 is a view similar to Fig. 3, showing the valve in an open position, but showing also the suction port closed by the shut-off member;

Fig. 5 is a diagrammatic plan view, partly in section, of the valve mechanism, showing the valve entering upon its open position;

Fig. 6 is a similar view showing the valve in a fully open position;

Fig. 7 is a similar view showing the valve entering its closed position; and

Fig. 8 is a composite view showing various parts of the eviscerator in separated relationship.

Figure 1:
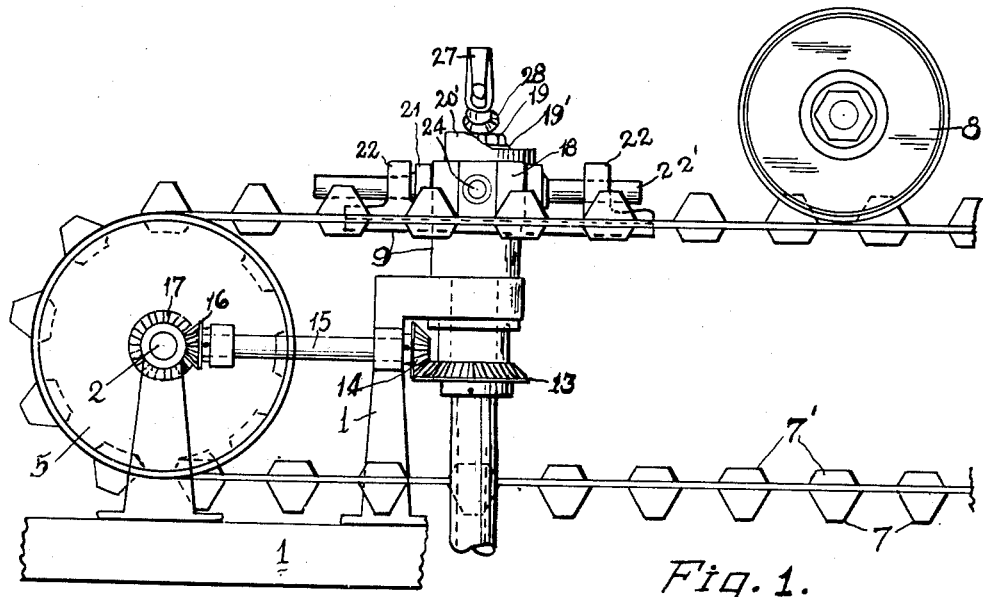
Fig. 1 is a side elevation of a fish eviscerating apparatus embodying my invention.
Figure 2:
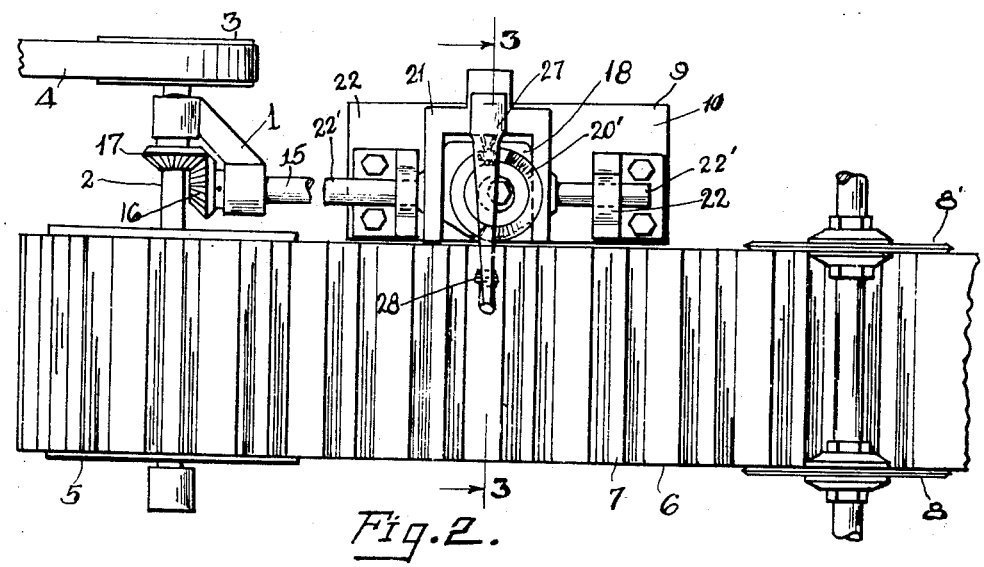
Fig. 2 is a top plan view of the same.

Referring to the drawings, the numeral 1 designates a suitable supporting structure having a drive shaft 2 journaled thereon. The drive shaft is rotated in a counter-clockwise direction as viewed in Fig. 1, as by a pulley 3 and a belt 4, the latter being suitably connected to a source of power such as an electric motor. A drum 5 keyed to the drive shaft 2 operatively engages with an endless fish conveyor 6, provided with a plurality of uniformly spaced cleats 7 which form fish holding pockets for maintaining the fish carried by the conveyor in uniformly spaced relation. While the conveyor 6 is shown as having inwardly disposed uniformly spaced cleats 7' engaging with suitably shaped transverse grooves in the outer surface of the drum, it is understood that other suitable means may be provided for operatively connecting the fish conveyor and the drive shaft.

The fish positioned on the conveyor 6 in the pockets between the cleats 7 with their heads and tails protruding from the side edges of the conveyor are conveyed into engagement with two rotating circular knives 8 and 8'. As the fish are successively engaged by the knives their heads and tails are severed, thereby exposing the viscera at their larger ends where their heads were removed.

Mounted on the supporting structure 1 is a stationary valve supporting member 9 having a plane bearing surface 10 at its upper side and a vertical opening 11, through which a tubular shaft 12' having a vacuum chamber therein, rotatably extends. Secured to the upper end of the tubular shaft 12' and arranged in eccentric relation thereto is a cylindrical shaped valve member 12 which rests on the bearing surface 10 of the valve supporting member 9. Secured to the tubular shaft 12' is a bevel gear 13 which meshes with a similar gear 14 carried on an end of a short shaft 15. The shaft 15 is connected by bevel gears 16 and 17 to the drive shaft 2. If preferred, other suitable means may be employed to effect the transmittal of rotary motion from the drive shaft 2 to the tubular shaft 12'.

Extending around and fitting against the cylindrical sides of the valve member 12 is a movable valve housing 18 which also rests on the bearing surface 10 of the supporting member 9. Secured to the valve member 12 by a screw 19 or other suitable means is a cam member 20 which slidably engages with and prevents the upward displacement of the valve housing 18 with respect to the valve member. A washer 19' is preferably interposed between the head of the screw 19 and the cam member 20. The cam member carries an upwardly projecting semi-circular cam 20' on its upper side. Extending partially around and engaging with three sides of the valve housing 18 is a U-shaped arm carrier 21 which is mounted for reciprocating movement along a path parallel to a longitudinal edge of the conveyor. The arm carrier 21 rests on the bearing surface 10 of the valve supporting member 9, and two longitudinally aligned rods 22' are secured to the opposed sides of such arm carrier. The rods slidably extend through two bearing posts 22 secured on the supporting member 9, and such bearing posts and rods are so arranged that the arm carrier 21 is guided in its reciprocating movement along a path which is parallel to a longitudinal side edge of the upper flight of the conveyor. The arm carrier 21 prevents the rotation of the valve housing 18 but does not interfere with its circular movement.

The valve member 12 is provided with a laterally extending fan shaped opening 23 which communicates with the opening of the tubular shaft 12'. The fan shaped opening 23 of the valve member 12 is adapted to communicate with a suction port 24 provided in the valve housing 18, as the valve member rotates, thereby allowing the fish viscera from a fish F positioned on the conveyor to be drawn through the suction port and the fan shaped opening into the axial opening of the tubular shaft, as will be later described. The suction port 24 is in a plane slightly above the level of the conveyor, thereby making it possible for the exposed viscera of a fish being carried on the conveyor to register with such suction port as the fish is advanced forwardly.

Pivotally mounted at one of its ends on a substantially horizontal pivot pin carried on an upwardly protruding boss 26 provided on the arm carrier 21 is a shut-off arm 27 which has a shut-off valve, enlargement or plug 28 on its free end. The plug 28 may take the form of a roller or enlargement on the arm 27, and it is adapted to act as a shut-off valve to close the suction port 24 when the arm 27 is in its lowered position. Mounted on a projecting member 30 carried by the shut-off arm 27 is a roller 29 which is mounted for engagement with the cam 20' of the cam member 20. As the cam member and valve member 12 are simultaneously rotated as a unit in a clockwise direction (Fig. 7) the cam 20' causes the shut-off arm to rise and fall. The plug or enlargement 28 is adapted to engage with the upper side of a fish F as it is conveyed into registry with the suction port. By such engagement with the fish the plug 28 is held in a raised position so it does not interfere with the registration of the fish viscera with the suction port. If it happens that there is no fish in the pocket of the conveyor then approaching the suction port 24 to intercept the plug 28 in its downward movement, the suction port will be closed by the plug while the opening 23 of the valve member 12 is in registry with the said suction port. Thus when there is no fish in the particular pocket of the conveyor which is then coming into registry with the suction port 24, the plug 28 will close the said suction port and thereby avoid the loss of vacuum.

A partial vacuum is created in the tubular shaft 12' and the valve opening 23 by a vacuum pump or other suitable means, and when such valve opening is in registry with the suction port 24 sufficient suction is applied to the viscera of the fish then positioned opposite the said suction port to cause such viscera to be drawn from the fish and carried through the suction port, the valve opening and the tubular member into a suitable discharge receptacle (not shown).

The conveyor 6 and the valve member 12 are synchronized so that the fish positioned in the pockets of the conveyor will be successively brought into a position opposite the suction port 24 at the precise time the said suction port is in communication with the valve opening 23. The eccentric relation of the valve member 12 with respect to the tubular shaft 12' causes the valve housing 18 to travel circularly on the valve supporting member 9 as the said shaft is rotated. When the valve member 12 makes a complete revolution in a clockwise direction as indicated by the arrow in Fig. 7, the movement of the valve housing 18 is such that the latter's suction port 24 travels circularly toward the moving conveyor to a position in which it registers with and contacts the viscera exposed end of a fish on such conveyor, and then recedes to a position where it no longer engages with such fish. During the time the suction port is in communication with the viscera of the fish the valve opening 23 is in communication with the suction port 24, thereby applying suction to such fish viscera. The larger cut ends of the fish project slightly from the longitudinal inner edge of the conveyor 6, thereby making it possible for the viscera exposed end of each fish to engage with that part of the valve housing 18 located at the outer end of the suction port. As illustrated, the valve housing preferably extends outwardly to provide an annular projecting seat or surface extending around the outer end portion of the valve port, and when the viscera of a fish come into registry with the suction port and suction is applied thereto, the inner cut end of such fish encasing the viscera is drawn into firm contact with the said annular seat or surface, thereby preventing loss of suction and at the same time making it possible for the maximum pull to be applied by suction on the fish viscera to effect their complete removal from the visceral cavity. It is to be noted that the valve member 12 and the valve housing 18 are so constructed and arranged that the suction port 24 reaches a point nearest the conveyor at the precise time the exposed fish viscera are carried into complete registry with the suction port. As the suction port and the fish viscera both simultaneously approach this position the valve opening 23 and the suction port 24 begin to register or communicate with one another. At this point in the suction cycle suction is commenced and first applied to the fish viscera, and then as the valve opening and the suction port gradually come into full registry with each other and the conveyor carries the fish to a position directly opposite the suction port and into full registry therewith the maximum suction is applied to the viscera. The viscera is drawn from the fish by the time the contact of the fish with the valve housing 18 is broken. As the rotary movement of the valve member 12 continues and the valve housing travels circularly, the suction port 24 recedes and moves backwardly in an arcuate path from the conveyor, thereby breaking the contact of the fish with the annular seat of the valve housing. As the rotary movement of the valve member continues the valve opening 23 and suction port 24 are carried to relative positions where they no longer communicate with one another, and suction is thereupon discontinued at the suction port.

It is to be noted that the cam 20', the valve member 12 and the valve housing 18 are so arranged and synchronized that the said housing travels in the same direction as the conveyor and at approximately the same speed when the suction cycle is commencing. Thus when the valve opening 23 and the suction port 24 are in registry the plug 28 will be in position to close the suction port if no fish is then on the conveyor to prevent the plug from moving downwardly.

It is also to be noted that the satisfactory functioning and operation of the eviscerating mechanism is not dependent upon the association therewith of the vacuum shut-off means. By providing suitable means for preventing the rotation of the valve housing 18, the arm carrier 21, the shut-off arm 27 and the plug 28 may be eliminated, providing the vacuum pressure applied through the vacuum chamber of the tubular shaft 12' is continuous and would not be materially diminished if the outer air is admitted when the valve opening and the suction port are in communication with each other. It is to be understood that fish placed on and carried in the pockets of the conveyor may be eviscerated in rapid succession by the apparatus comprising the present invention.

What I claim is:

1. In a fish eviscerator, a rotatable tubular shaft arranged in an upright position and having a vacuum chamber therein, a rotatable cylindrical valve member carried on the upper end of the shaft and having a valve opening extending from its periphery to the opening through the shaft, the said valve member and the shaft being in eccentric relationship, a valve housing extending around and arranged in contacting relation with the cylindrical sides of the valve member, the said valve housing being mounted for non-rotary but circular movement, the said valve housing having a suction port, the said suction port being adapted to communicate with the valve opening when the valve member rotates within the valve housing, and a fish conveyor positioned alongside the valve housing, the fish conveyor, the valve member and the valve housing being synchronized so that fish on the conveyor are successively conveyed to a position with their exposed cut ends positioned opposite the suction port at a time when the valve opening and the suction port are in communication with each other.

2. In a fish eviscerator, a rotatable tubular shaft arranged in an upright position and having a vacuum chamber therein, a rotatable cylindrical valve member carried on the upper end of the shaft and having a valve opening extending from its periphery to the vacuum chamber of the shaft, the said valve member being in eccentric relation to the shaft, a valve housing extending around and arranged in contacting relation with the cylindrical sides of the valve member, the said valve housing being mounted for non-rotary but circular movement, means preventing the rotation of the valve housing, the said valve housing having a suction port, the said suction port being arranged to register with the valve opening when the valve member rotates within the valve housing, a fish conveyor having uniformly spaced fish holding pockets, the said fish conveyor being arranged alongside the valve housing and adapted to deliver fish to a position opposite the suction port, and means for severing the heads from the fish carried by the conveyor, the fish conveyor, the valve member and the valve housing being synchronized so that fish on the conveyor are successively conveyed into an eviscerating position opposite the suction port at the time the valve opening and the suction port are in communication with each other.

3. In a fish eviscerator, a rotatable cylindrical valve member mounted eccentrically on a rotatable shaft and having a valve opening in communication with a vacuum chamber, the said valve opening extending from the vacuum chamber to the periphery of the valve member, a valve housing mounted for circular but non-rotary movement and extending around and in contacting relationship with the periphery of the valve member and having a suction port, the said suction port being arranged for intermittent communication with the valve opening as the valve member rotates, a fish conveyor having uniformly spaced fish holding pockets, the said fish conveyor being arranged alongside the valve housing and adapted to deliver fish to an eviscerating position opposite the suction port.

4. In a fish eviscerator, a rotatable cylindrical valve member mounted eccentrically on a rotatable shaft and having a valve opening in communication with a vacuum chamber, the said valve opening extending from the vacuum chamber to the periphery of the valve member, a valve housing mounted for circular but non-rotary movement and extending around and in contacting relationship with the periphery of the valve member and having a suction port, the said suction port being arranged for intermittent communication with the valve opening as the valve member rotates, a fish conveyor having uniformly spaced fish holding pockets, the said fish conveyor being arranged alongside the valve housing and adapted to deliver fish to an eviscerating station opposite the suction port, the conveyor, the valve member and the valve housing being synchronized so that fish on the conveyor are successively conveyed to the eviscerating station opposite the suction port at the time the valve opening and the suction port are in communication with one another, a U-shaped carrier member mounted for reciprocating movement in a direction parallel to the longitudinal side edges of the conveyor, the said carrier being in contacting relation with the valve housing, a cam secured to the valve member, an arm pivotally mounted on the carrier member, a port closing valve carried by the arm and arranged to close the suction port when there is no fish at the eviscerating station, the said port closing valve being adapted to engage with a fish at the suction station and be held by such fish in spaced relation to the suction port, and a projecting member on the arm engaging with the cam.

5. In a fish eviscerator, a rotatable shaft, an eccentric rotatable valve member secured to the shaft and having an arcuate side and a valve opening extending from the said arcuate side to a vacuum chamber, a valve housing extending around the valve member and in contact with the arcuate side of such valve member, the said valve housing being mounted for circular but not rotary movement, the said valve housing having a suction port arranged for intermittent registry with the valve opening as the valve member rotates, and means for delivering fish to an eviscerating station located opposite to and in close proximity to the suction port at a time when the valve opening and the suction port are in registry.

References Cited in the file of this patent

UNITED STATES PATENTS

| | | |
|---|---|---|
| 1,134,529 | Hauber | Apr. 6, 1915 |
| 1,463,111 | Abbott | July 24, 1923 |
| 2,477,168 | Bradley | July 26, 1949 |
| 2,483,470 | Lockwood et al. | Oct. 4, 1949 |
| 2,498,993 | Kuther | Feb. 28, 1950 |